US011486889B2

United States Patent
Ballen et al.

(10) Patent No.: US 11,486,889 B2
(45) Date of Patent: *Nov. 1, 2022

(54) PROBE TIP EJECT DEVICES AND METHODS THEREOF FOR AUTOMATED DIAGNOSTIC ANALYSIS APPARATUS

(71) Applicant: Siemens Healthcare Diagnostics Inc., Tarrytown, NY (US)

(72) Inventors: Toby Ballen, Midland Park, NJ (US); Frank Bakonyi, New Fairfield, CT (US); Steffen Pharai, Thiells, NY (US); Domenick Ansalone, New City, NY (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 186 days.

This patent is subject to a terminal disclaimer.

(21) Appl. No.: 16/769,521

(22) PCT Filed: Nov. 16, 2018

(86) PCT No.: PCT/US2018/061460
§ 371 (c)(1),
(2) Date: Jun. 3, 2020

(87) PCT Pub. No.: WO2019/112777
PCT Pub. Date: Jun. 13, 2019

(65) Prior Publication Data
US 2021/0165006 A1    Jun. 3, 2021

Related U.S. Application Data

(60) Provisional application No. 62/595,016, filed on Dec. 5, 2017.

(51) Int. Cl.
*G01N 35/10* (2006.01)

(52) U.S. Cl.
CPC ....... *G01N 35/10* (2013.01); *G01N 2035/103* (2013.01); *G01N 2035/1048* (2013.01)

(58) Field of Classification Search
CPC ............. G01N 35/10; G01N 2035/103; G01N 2035/1048; B01L 2200/025; B01L 2200/141; B01L 3/0279
See application file for complete search history.

(56) References Cited

U.S. PATENT DOCUMENTS

RE27,637 E      5/1973  Roach
2006/0211080 A1 9/2006  Frost, III et al.
(Continued)

FOREIGN PATENT DOCUMENTS

CN    103119450 A    5/2013
CN    203816657 U    9/2014
(Continued)

OTHER PUBLICATIONS

PCT International Search Report and Written Opinion dated Jan. 25, 2019 (8 Pages).
(Continued)

*Primary Examiner* — Suman K Nath

(57) ABSTRACT

Automated diagnostic analysis apparatus for analyzing patient specimens may include a probe to aspirate and dispense a bio-liquid. A probe tip on the probe may require replacement after contact with each bio-liquid. The automated diagnostic analysis apparatus may include a probe tip eject device and a waste chute for controlled removal and disposal of the probe tip to mitigate splattering or splashing of any residual bio-liquid in the probe tip as it is removed from the probe. A sloped ramp in the probe tip eject device may engage and remove the probe tip as it rotates through the probe tip eject device. The waste chute may include guides to transfer a removed probe tip directly into a waste bin without any surface contact by the probe tip. Methods of
(Continued)

removing and disposing of a probe tip in an automated diagnostic analysis apparatus are described, as are other aspects.

20 Claims, 10 Drawing Sheets

(56) References Cited

U.S. PATENT DOCUMENTS

| | | |
|---|---|---|
| 2007/0180935 A1 | 8/2007 | Angus et al. |
| 2008/0095671 A1 | 4/2008 | Mathus et al. |
| 2010/0288395 A1* | 11/2010 | Hagen ................ B03C 1/14 141/234 |
| 2011/0214617 A1 | 9/2011 | Markham |
| 2013/0132006 A1* | 5/2013 | Gwynn ................ C12P 19/34 702/55 |

FOREIGN PATENT DOCUMENTS

| | | |
|---|---|---|
| CN | 204 414 565 U | 6/2015 |
| CN | 105460273 A | 4/2016 |
| CN | 106391155 A | 2/2017 |
| CN | 106443034 A | 2/2017 |
| DE | 19917855 A1 | 1/2000 |
| JP | H08 285862 A | 11/1996 |
| JP | 2002080910 A | 3/2002 |

OTHER PUBLICATIONS

Extended EP Search Report dated Nov. 26, 2020 of corresponding European Application No. 18885959.9, 5 Pages.

* cited by examiner

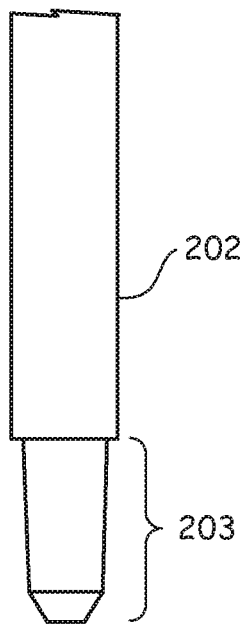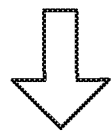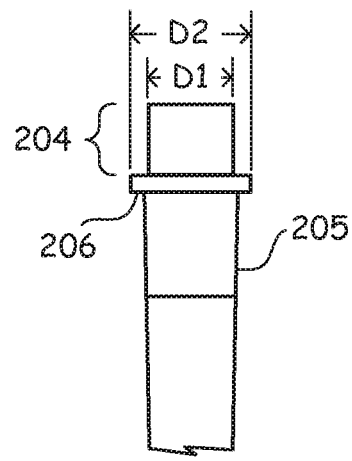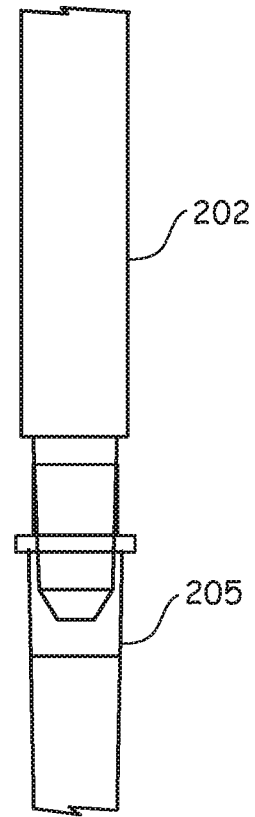
*FIG. 2A*  *FIG. 2B*

PROBE TIP EJECT DEVICES AND METHODS THEREOF FOR AUTOMATED DIAGNOSTIC ANALYSIS APPARATUS

CROSS-REFERENCE TO RELATED APPLICATIONS

This application claims priority to U.S. Provisional Application Ser. No. 62/595,016 filed on Dec. 5, 2017, the contents of which is incorporated herein by reference in its entirety.

FIELD

This disclosure relates to removing and disposing of probe tips used in automated diagnostic analysis apparatus.

BACKGROUND

Automated diagnostic analysis apparatus (e.g., chemical analyzers or immunoassay instruments) may be used to analyze patient specimens. Patient specimens may include, e.g., urine, blood serum or plasma, cerebrospinal liquids, and the like (hereinafter "bio-liquid"). Automated diagnostic analysis apparatus may include a probe that aspirates a bio-liquid from one container (e.g., a patient sample tube) and dispenses it to another (e.g., a test vessel). The probe may have a probe tip press fit thereon that is replaced after each use to avoid contaminating other bio-liquid samples. To maintain high sample analysis throughput, automated diagnostic analysis apparatus removes, disposes, and replaces probe tips automatically.

However, such automated probe tip removal processes may cause certain problems. Accordingly, there is a need for improved probe tip removal and disposal in automated diagnostic analysis apparatus.

SUMMARY

According to a first embodiment, a probe tip eject device of an automated diagnostic analysis apparatus is provided. The probe tip eject device includes a body having a top, a first side, and a second side opposite the first side. The top has an arcuate slot extending there across from the first side toward the second side. The first side has an opening aligned with the arcuate slot. The opening and the arcuate slot each have a width sized to receive a top portion of a probe tip. The probe tip eject device also includes a ramp disposed within the body that slopes downward from the first side toward the second side, wherein the arcuate slot extends downward through the body and the ramp. The ramp is sized to engage a top of a flange of the probe tip, wherein the flange is disposed below and extends outward from the top portion of the probe tip.

According to another embodiment, an automated diagnostic analysis apparatus is provided. The automated diagnostic analysis apparatus includes a probe arm, a robot coupled to the probe arm and capable of at least rotating the probe arm horizontally, a probe coupled to the probe arm and having a probe tip press fit onto an end of the probe, the probe configured to aspirate and dispense a bio-liquid, and a probe tip eject device. The probe tip eject device includes a body having a top, a first side, and a second side opposite the first side. The top has an arcuate slot extending there across from the first side toward the second side. The first side has an opening aligned with the arcuate slot. The opening and the arcuate slot each have a width sized to receive a top portion of a probe tip. The probe tip eject device also includes a ramp disposed within the body that slopes downward from the first side toward the second side wherein the arcuate slot extends downward through the body and the ramp. The ramp is sized to engage a top of a flange of the probe tip, wherein the flange is disposed below and extends outward from the top portion of the probe tip. Furthermore, the robot is configured to rotate the probe to the probe tip eject device and along the arcuate slot from the first side toward the second side, and rotation of the probe along the arcuate slot from the first side toward the second side causes the probe tip to separate from the probe.

According to another embodiment, a method of removing a probe tip from a probe in an automated diagnostic analysis apparatus is provided. The method includes rotating the probe to an arcuate slot of a probe tip eject device, the probe having a probe tip that is press fit on an end thereof; engaging a top of a flange of the probe tip with a ramp of the probe tip eject device while rotating the probe along the arcuate slot; and rotating the probe along the arcuate slot until the probe tip is separated from the probe.

Still other aspects, features, and advantages of this disclosure may be readily apparent from the following detailed description illustrated by a number of example embodiments and implementations, including the best mode contemplated for carrying out the invention. This disclosure may also be capable of other and different embodiments, and its several details may be modified in various respects. Accordingly, the drawings and descriptions are to be regarded as illustrative in nature, and not as restrictive. The drawings are not necessarily drawn to scale. This disclosure covers all modifications, equivalents, and alternatives falling within the scope of the claims.

BRIEF DESCRIPTION OF THE DRAWINGS

FIGS. 2A and 2B illustrate side views of a bottom section of a probe and a top section of a probe tip of an automated diagnostic analysis apparatus according to embodiments.

DETAILED DESCRIPTION

Figure 1:
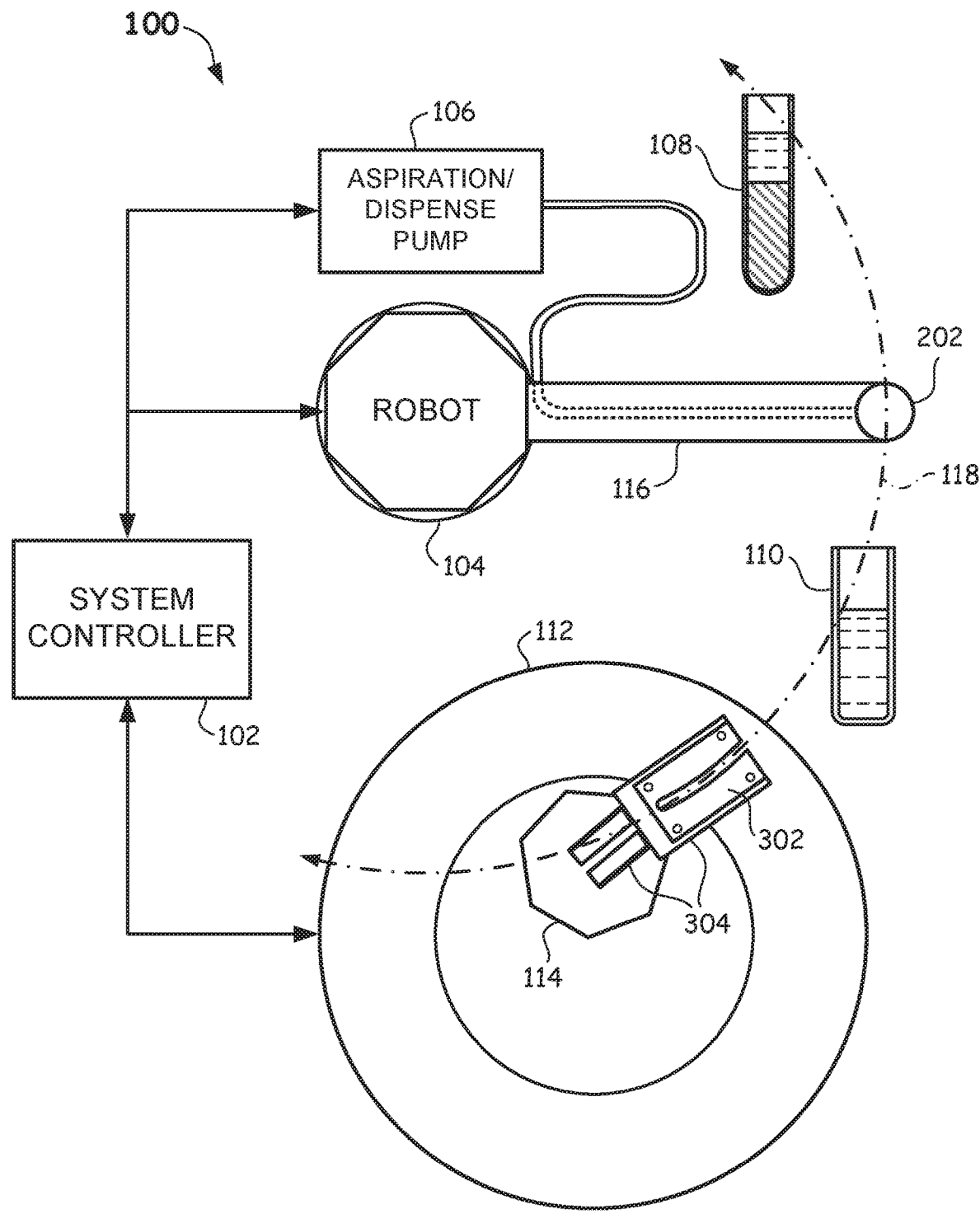
FIG. 1 illustrates a simplified schematic view of an automated diagnostic analysis apparatus according to embodiments.

In some embodiments of automated diagnostic analysis apparatus, the manner in which a probe tip is removed may cause residual bio-liquid inside the probe tip to shear and splatter, which may contaminate the probe, thus possibly compromising subsequent sample analyses. The shear and splatter of residual bio-liquid may also result in clogging or restriction of the probe. Furthermore, in some automated diagnostic analysis apparatus, residual bio-liquid inside the removed probe tip may splatter onto internal surfaces of a probe tip waste chute, where the splattered residual bio-liquid may stick and build up. This may cause removed probe tips to stick and become jammed within the probe tip waste chute, which may then require manual cleaning. Each of these conditions may cause the automated diagnostic analysis apparatus to be shut down while corrective measures are taken, thus adversely affecting sample analysis throughput.

In some known automated diagnostic analysis apparatus, automated removal of a probe tip that is press fit onto an end of a probe (e.g., onto a plunger of the probe) may be performed by moving the probe (via a robot capable of X-Y-Z motion) into a U-shaped stripper plate such that a flange on the probe tip is positioned below the stripper plate. The probe may then be pulled up via the robot until the probe tip separates from the probe. This may, however, result in a mechanical and servo buildup of energy that releases a sudden pressure spike when the force is sufficient to overcome the press fit between the probe tip and the probe. The sudden separation of the probe tip in this manner may cause residual bio-liquid inside the probe tip to shear and splash, which may contaminate the probe and thus compromise subsequent sample analyses. The shear and splash of residual bio-liquid may also result in clogging of the probe, which may cause a mechanical failure of the automated diagnostic analysis apparatus. Furthermore, residual bio-liquid inside the removed probe tip may further splash or splatter onto internal sloped surfaces of a probe tip waste chute configured to receive and direct removed probe tips into a waste bin. The splashed and splattered residual bio-liquid on the waste chute surfaces may build up and cause removed probe tips to become jammed within the probe tip waste chute, which may then require manual cleaning.

Accordingly, in a first aspect, some embodiments of the disclosure provide a probe tip eject device of an automated diagnostic analysis apparatus that may control the relative speed at which the probe tip is removed from the probe such that the removal may occur without, or with a substantially reduced, sudden pressure spike. This controlled removal, via an inclined ramp in the probe tip eject device, described in more detail below, may allow automated diagnostic analysis apparatus to use smaller bio-liquid sample volumes (and thus less patient sample waste) without probe contamination. The speed of the probe tip removal from the probe may be based on the angle of the inclined ramp and the rotational speed of the probe (as rotated by a robot) through the probe tip eject device. In particular, use of the inclined ramp of the probe tip eject device with a fixed rotational speed of the probe may eliminate or substantially reduce the effects of servo and mechanical compliance when removing a probe tip from a probe. By eliminating or substantially reducing the effects of servo and mechanical compliance, significant pressure spikes that have caused residual bio-liquid shearing and splattering may also be eliminated or substantially reduced. After a probe tip is removed from a probe, the probe tip eject device, in some embodiments, may advantageously transfer for disposal the removed probe tip horizontally in a substantially upright position (i.e., +/−10 degrees from vertical) to avoid contacting/contaminating any surface.

In a second aspect, some embodiments of the disclosure provide a probe tip waste chute of an automated diagnostic analysis apparatus that may control the transfer of removed probe tips to a location where the removed probe tips may be dropped vertically into a waste bin without contacting any waste chute wall surfaces. This transfer may eliminate the need for any inclined waste chute surfaces that may be subject to residue contact and buildup that can cause removed probe tip jams. In some embodiments, the probe tip waste chute may include a guide plate configured to receive from the probe tip eject device a removed probe tip in a substantially upright position (i.e., +/−10 degrees from vertical). In some embodiments, the probe tip waste chute may further include a pair of guide rails configured to receive from the guide plate a removed probe tip in the substantially upright position. The pair of guide rails, which may be sloped downward away from the guide plate, may be configured to transfer removed probe tips in the substantially upright position with their contaminated ends suspended freely without the risk of contacting or contaminating any surface as they move along the guide plate and pair of guide rails to a waste bin location.

These and other aspects and features of embodiments of the disclosure will be described herein in connection with FIGS. 1-9.

FIG. 1 illustrates an automated diagnostic analysis apparatus 100 according to embodiments. Automated diagnostic analysis apparatus 100 may be used to analyze patient specimens and may include a system controller 102, a robot 104, an aspiration/dispense pump 106, a patient sample tube 108, a test vessel 110, an incubation ring 112, a probe tip eject device 302, a probe tip waste chute 304, and a waste bin 114.

System controller 102 may include a memory (not shown) configured to store programming instructions, test result data, and/or other information/data. System controller 102 may also include a processor (not shown) configured to execute programming instructions in connection with the operation of automated diagnostic analysis apparatus 100, including control and operation of robot 104, aspiration/dispense pump 106, and incubation ring 112.

Robot 104 may be coupled to a probe arm 116, and a probe 202 may be coupled to probe arm 116. Robot 104 may be configured to carry out motion of probe 202 in one or more coordinate directions, such as in the X, Y, and Z directions. For example, robot 104 may be configured to rotate probe arm 116 horizontally such that probe 202 follows rotational path 118.

Aspiration/dispense pump 106 may be a piston-type pump that may be driven by a suitable motor (not shown) coupled thereto, such as a stepper motor. Other types of pumps may be used. Aspiration/dispense pump 106 may be configured via positioning of probe 202 by robot 104 to aspirate (i.e., draw in) a volume of bio-liquid (e.g., urine, blood serum or plasma, cerebrospinal liquids, or the like) from patient sample tube 108 and to dispense that bio-liquid volume into test vessel 110. Aspiration/dispense pump 106 may also be configured to aspirate a volume of one or more other liquids, such as a reagent and/or diluent, from one or more containers (not shown) and to dispense that volume also into test vessel 110.

Incubation ring 112 may be rotatable and may include a heated chamber and multiple test vessel receiving locations within the heated chamber for incubation of test samples.

Other conventional components of automated diagnostic analysis apparatus 100 are not shown for clarity, which may include, e.g., one or more of a wash station, a test vessel supply, a probe tip storage, a transfer robot for transferring the test vessels, test vessel heating apparatus, a reagent carousel holding a plurality of reagent supplies, and one or more testing devices (e.g., a luminometer or other optical testing equipment).

As shown in FIGS. 2A and 2B, a probe 202 (partially shown) may have a bottom portion 203 configured to be press fit into a top portion 204 of a probe tip 205 (also partially shown). Probe tip 205 may have a flange 206 disposed below and extending outward from and around top portion 204 of probe tip 205. In some embodiments, the uppermost diameter D1 of top portion 204 may range from 5.4 mm to 5.7 mm, and the diameter D2 of flange 206 may range from 8.1 mm to 8.4 mm. Other embodiments may have other diameter values for D1 and/or D2. FIG. 2A shows probe 202 prior to a robot (such as, e.g., robot 104) driving probe 202 (and bottom portion 203) downward into top portion 204 of probe tip 205, and FIG. 2B shows probe tip 205 press fit onto bottom portion 203 of probe 202.

Figure 3A:
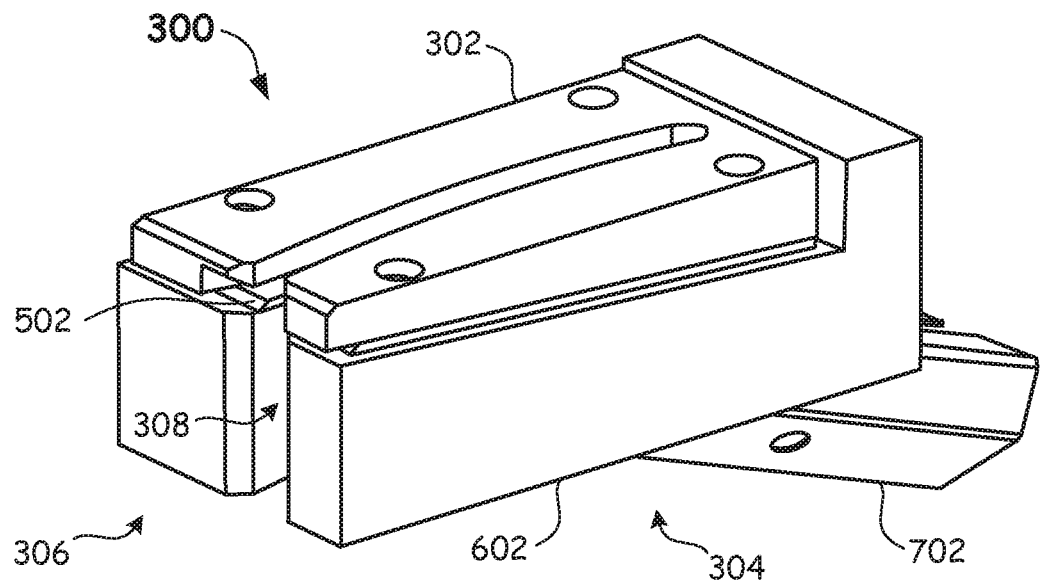
FIGS. 3A and 3B illustrate respective front and rear perspective views of a probe tip eject device and a waste chute assembly of an automated diagnostic analysis apparatus according to embodiments.
Figure 3B:
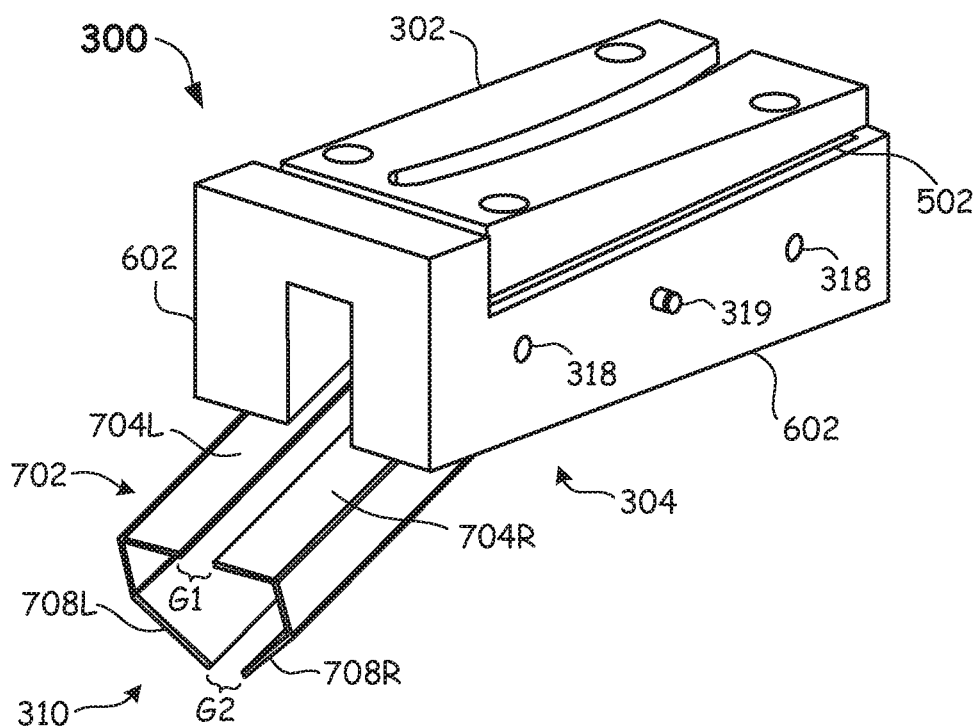

FIGS. 3A and 3B illustrate an assembly 300 that includes probe tip eject device 302 coupled to probe tip waste chute 304 according to embodiments. Alternative to the coupling features described below, probe tip eject device 302 may be coupled (e.g., fastened, mounted, and/or otherwise attached) to probe tip waste chute 304 to form assembly 300 in any suitable manner. Assembly 300 may have a first side 306 having an opening 308 for receiving via a robot (e.g., robot 104) a probe with a probe tip press fit thereon (such as, e.g., probe 202 and probe tip 205 of FIGS. 2A and 2B). Assembly 300 also may have a second side 310 for directing a removed probe tip 205 to a waste bin (such as, e.g., waste bin 114 of FIG. 1).

Figure 4A:
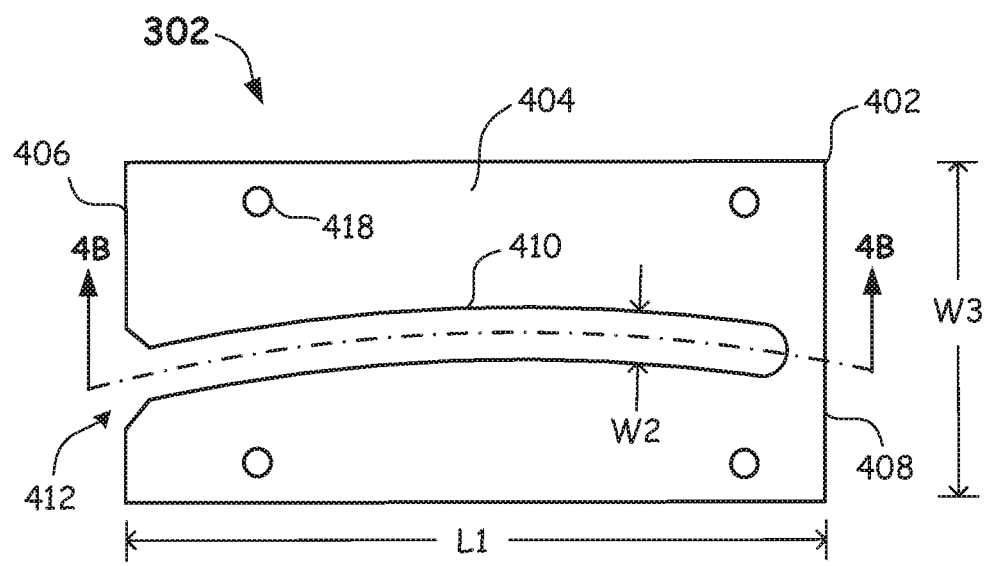
FIGS. 4A, 4B, and 4C illustrate respective top, cross-sectional (taken along line 4B-4B of FIG. 4A), and bottom views of the probe tip eject device of FIGS. 3A and 3B according to embodiments.
Figure 4B:
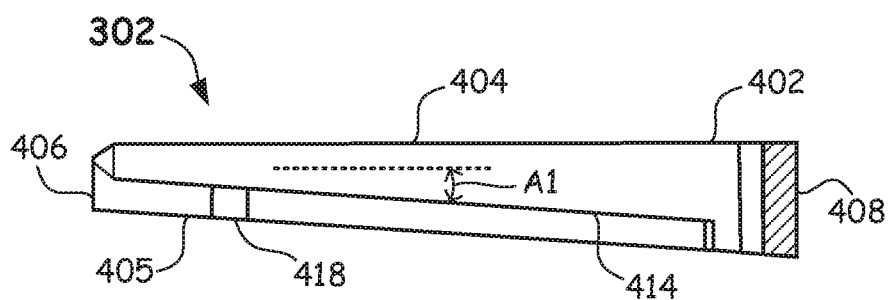
Figure 4C:
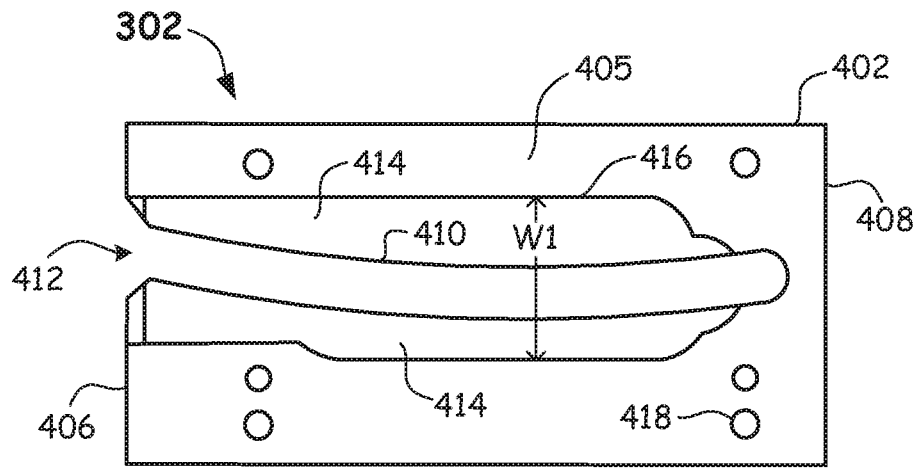

As shown in FIGS. 4A-4C, probe tip eject device 302 has a body 402 that may be generally rectangular. Body 402 has a top 404, a bottom 405, a first side 406, and a second side 408 opposite first side 406. Top 404 may have an arcuate slot 410 extending there across from first side 406 toward second side 408. First side 406 may have an opening 412 aligned with arcuate slot 410. Opening 412 and arcuate slot 410 each may have a width sized to receive a top portion of a probe tip, such as, e.g., top portion 204 of probe tip 205. Probe tip eject device 302 may also have a ramp 414 disposed within body 402 that slopes downward from first side 406 toward second side 408, wherein arcuate slot 410 may extend downward through body 402 and ramp 414. Ramp 414 may be sized to engage a top of a flange of a probe tip, such as, e.g., the top of flange 206 of probe tip 205. Bottom 405 may have a bottom opening 416 extending there across from first side 406 toward second side 408. Bottom opening 416 may have a width W1 wider than flange 206 of probe tip 205. Probe tip eject device 302 may further have a number of fastening/mounting holes 418 (only one labeled in each of FIGS. 4A-4C) for fastening or mounting to probe tip waste chute 304 using any suitable fastener, mounting pin, and/or the like. While four fastening/mounting holes 418 are shown on top 404 and six fastening/mounting holes 418 on shown on bottom 405 (i.e., two fastening/mounting holes 418 do not extend through from bottom 405 to top 404), other embodiments may have other numbers and configurations of fastening/mounting holes 418, and other embodiments may employ other suitable techniques for attaching probe tip eject device 302 to probe tip waste chute 304.

In one or more embodiments, body 402 may be made of polyethylene terephthalate (PET-P), machined plastic, or other materials suitable for repeated use as described further below. In some embodiments, arcuate slot 410 may have a center radius ranging from 200 mm to 210 mm and may have a width W2 ranging from 6.3 mm to 6.7 mm. In other embodiments, arcuate slot 410 may have a center radius of 204 mm+/−0.2 mm. In some embodiments, ramp 414 may slope downward at an angle A1 ranging from 3 degrees to 8 degrees and may be determined based on tip removal speed and the rotational speed of the probe tip as described further below. In other embodiments, ramp 414 may slope downward at an angle A1 of 3.5 degrees+/−1.5 degrees. In some embodiments, body 402 may have a length L1 measured from first side 406 to second side 408 ranging from 8.0 cm to 9.0 cm and/or may have a width W3 ranging from 4.0 cm to 4.5 cm. In some embodiments, opening 412 at first side 406 may have a width ranging from 1.1 cm to 1.4 cm. Probe tip eject device 302 may have other suitable dimensions corresponding to probes and probe tips used therewith.

Returning to FIGS. 3A and 3B, probe tip waste chute 304 may include a guide plate 502, a waste chute housing 602, and a pair of guide rails 702. Guide plate 502 may be positioned between probe tip eject device 302 and waste chute housing 602, and a first end of the pair of guide rails 702 may be attached to an interior of waste chute housing 602, while a second end of the pair of guide rails 702 may extend outward and downward from second side 310 of assembly 300. In some embodiments, the pair of guide rails 702 may be sloped downward at an angle ranging from 15 degrees to 25 degrees. One side of waste chute housing 602 may have two or more fastening/mounting holes 318 (two are shown in FIG. 3B) and/or one or more mounting pins 319 (one is shown in FIG. 3B) configured for positioning and attaching assembly 300 to a suitable structure, such as, e.g., a chassis gantry, of an automated diagnostic analysis apparatus (such as, e.g., automated diagnostic analysis apparatus 100). Assembly 300 should be attached to a structure of an automated diagnostic analysis apparatus such that arcuate slot 410 of probe tip eject device 302 lies in a horizontal rotational path of a robot configured to transport a probe (such as, e.g., rotational path 118, robot 104, and probe 202 of FIG. 1).

Figure 5A:
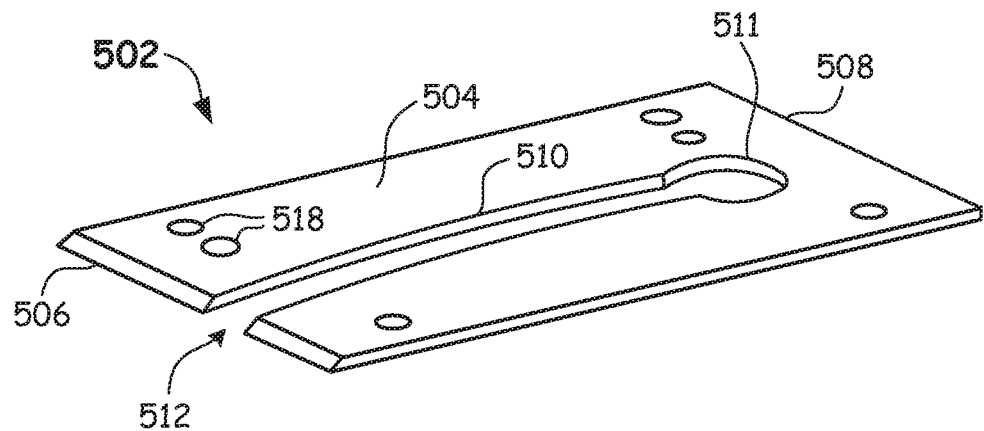
FIGS. 5A and 5B illustrate perspective and top views, respectively, of a guide plate of the probe tip waste chute of FIGS. 3A and 3B according to embodiments.
Figure 5B:
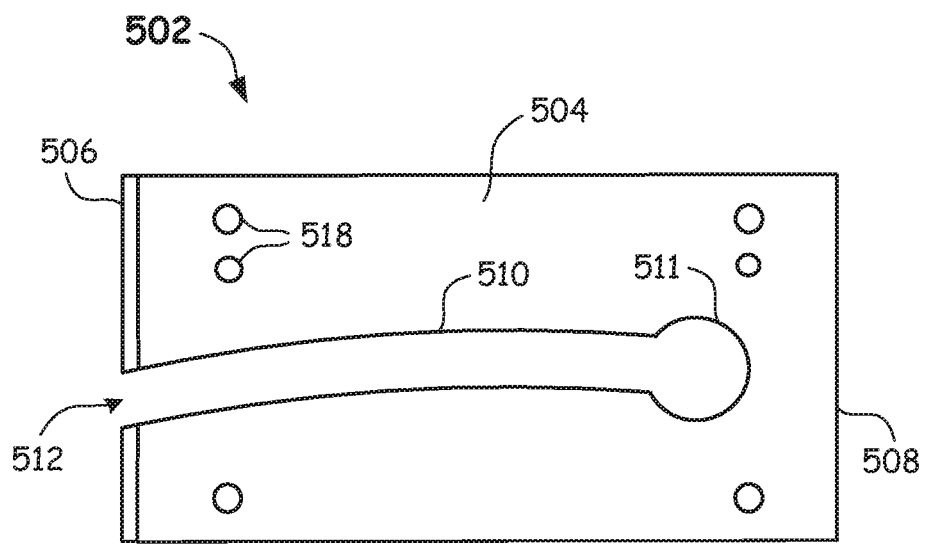

FIGS. 5A and 5B illustrate guide plate 502 according to embodiments. Guide plate 502 may be a generally rectangular flat plate and may be made of stainless steel. Other suitable materials may be used. Guide plate 502 may have a top 504, a first side 506, and a second side 508 opposite first side 506. Guide plate 502 may also have an arcuate slot 510 extending there across from first side 506 toward second side 508. A keyhole 511 may extend from arcuate slot 510 at an end thereof adjacent second side 508. Keyhole 511 may be sized and configured to allow a flange of a probe tip (such as, e.g., flange 206 of probe tip 205) to pass there through, as described in more detail below in connection with FIGS. 8A-8C. First side 506 may have an opening 512 aligned with arcuate slot 510. Opening 512 and arcuate slot 510 may each have a width sized to receive a top portion of a probe tip (such as, e.g., top portion 204 of probe tip 205). Arcuate slot 510 may be dimensioned substantially identically as arcuate slot 410 of probe tip eject device 302 and may be substantially aligned therewith in assembly 300 such that a probe with an attached probe tip may pass there through from first side 506 toward second side 508 substantially upright (i.e., +/−10% from vertical). Guide plate 502 may further have six fastening/mounting holes 518 (only two labeled in each of FIGS. 5A and 5B) for fastening and/or mounting to waste chute housing 602 in assembly 300. Any suitable fastener, mounting pin, and/or the like may be used.

Fastening/mounting holes 518 may align with fastening/mounting holes 418 of probe tip eject device 302 in assembly 300. Other embodiments may have other numbers and configurations of fastening/mounting holes 518, and other embodiments may employ other suitable techniques for coupling guide plate 502 to waste chute housing 602 in assembly 300.

Figure 6A:
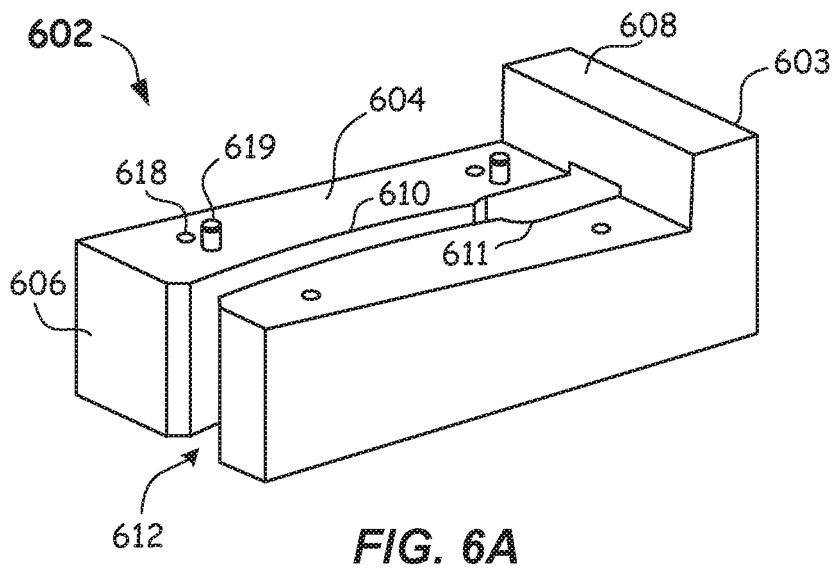
FIGS. 6A, 6B, and 6C illustrate respective front perspective, cross-sectional perspective, and bottom views of a housing of the probe tip waste chute of FIGS. 3A and 3B according to embodiments.
Figure 6B:
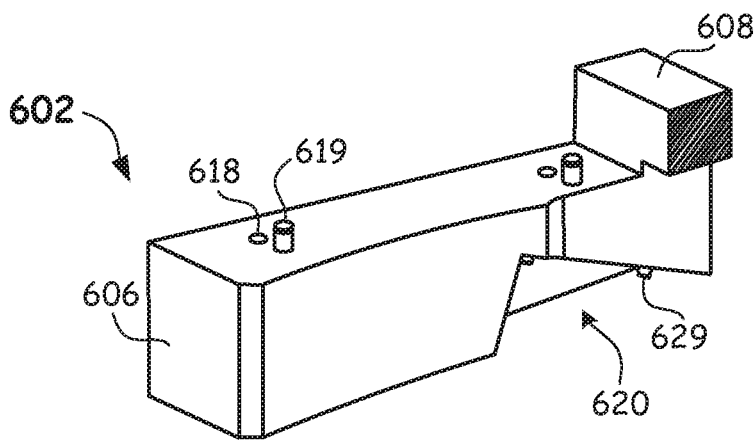
Figure 6C:
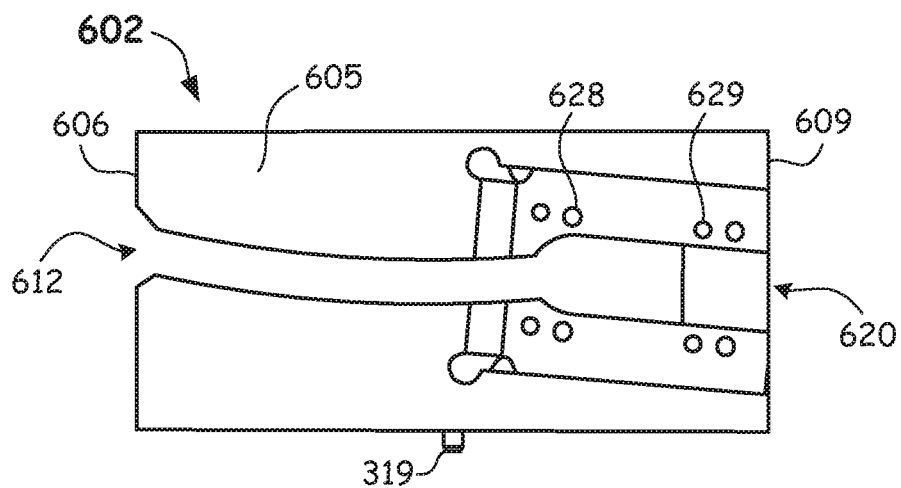

FIGS. 6A-6C illustrate waste chute housing 602 according to embodiments. Waste chute housing 602 has a body 603 that may be generally rectangular and may be made of machined aluminum. Other suitable materials may be used. Body 603 may have a receiving platform 604, a bottom 605, a first side 606, and a backstop 608 opposite first side 606. Receiving platform 604 may have a downward slope extending from first side 606 to backstop 608. In some embodiments, the downward slope of receiving platform 604 may be the same as or similar to the downward slope of ramp 414 of probe tip eject device 302. Receiving platform 604 may have four fastening/mounting holes 618 (only one labeled in FIGS. 6A and 6B) and two mounting pins 619 (only one labeled in FIGS. 6A and 6B) configured to receive guide plate 502 thereon (via aligned fastening/mounting holes 518) and probe tip eject device 302 on top of guide plate 502 (via aligned fastening/mounting holes 418). Any suitable fastener or the like may be used therewith. Other embodiments may have other numbers and configurations of fastening/mounting holes 618 and mounting pins 619 (which should closely correspond to and/or be aligned with the numbers and configurations of fastening/mounting holes 418 and fastening/mounting holes 518). Other embodiments may employ other suitable techniques for coupling guide plate 502 and probe tip eject device 302 to waste chute housing 602 in assembly 300.

Waste chute housing 602 may also have an arcuate slot 610 extending there across from first side 606 toward backstop 608 and from receiving platform 604 to bottom 605. An expanded slot 611 may extend from arcuate slot 610 at an end adjacent to backstop 608. Expanded slot 611 may be sized and configured to allow a flange of a probe tip (such as, e.g., flange 206 of probe tip 205) to pass there through, as described in more detail below in connection with FIGS. 8A-8C. First side 606 may have an opening 612 aligned with arcuate slot 610. Opening 612 and arcuate slot 610 may each have a width sized to receive a portion of a probe tip below its flange. Arcuate slot 610 may be dimensioned substantially identically or similarly as arcuate slots 410 and 510 and may be substantially aligned therewith in assembly 300 such that a probe tip may pass there through from first side 606 toward backstop 608 substantially upright (i.e., +/−10% from vertical).

Waste chute housing 602 may further have an interior area 620 that extends to bottom 605 and is configured to receive and couple thereto a first end of the pair of guide rails 702. Interior area 620 may include a number of fastening/mounting holes 628 (four are shown in FIG. 6C, only one is labeled) and mounting pins 629 (two are shown in FIG. 6B and four are shown in FIG. 6C, only one each is labeled) each configured to align with and/or couple to corresponding fastening/mounting holes on the first end of the pair of guide rails 702. Other embodiments may have other numbers and configurations of fastening/mounting holes 628 and mounting pins 629 (which should closely correspond to and/or align with the numbers and configurations of fastening/mounting holes on the first end of the pair of guide rails 702). Other embodiments may employ other suitable techniques for coupling the first end of the pair of guide rails 702 to interior area 620 of waste chute housing 602.

Waste chute housing 602 may be dimensioned substantially similarly as guide plate 502 and/or probe tip eject device 302 except for the clearance provided by backstop 608. In some embodiments, backstop 608 may add an additional 0.7 cm to 1.1 cm to the length of waste chute housing 602 (measured from first side 606 to a backside 609 (see FIG. 6C) of backstop 608) and may serve to connect the two halves of waste chute housing 602 as shown.

Figure 7A:
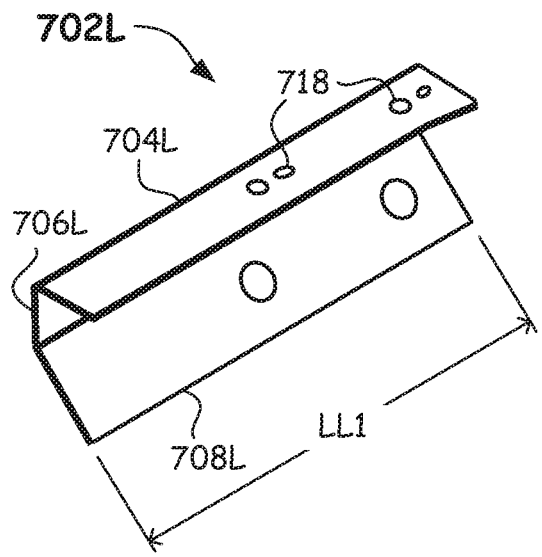
FIGS. 7A and 7B illustrate front perspective views of a left guide rail of the probe tip waste chute of FIGS. 3A and 3B according to embodiments.
Figure 7C:
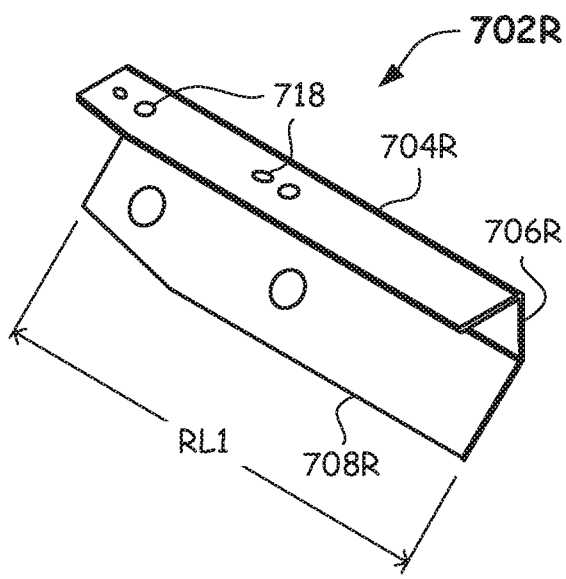
FIGS. 7C and 7D illustrate end views of a right guide rail of the probe tip waste chute of FIGS. 3A and 3B according to embodiments.
Figure 7B:
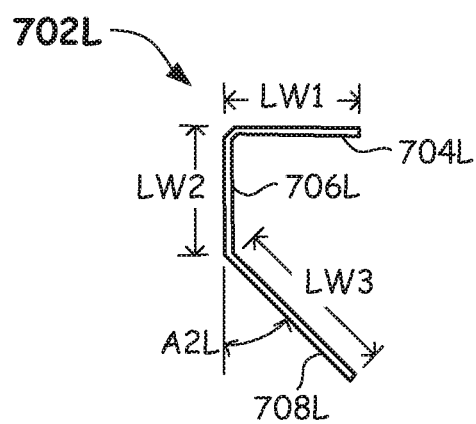
Figure 7D:
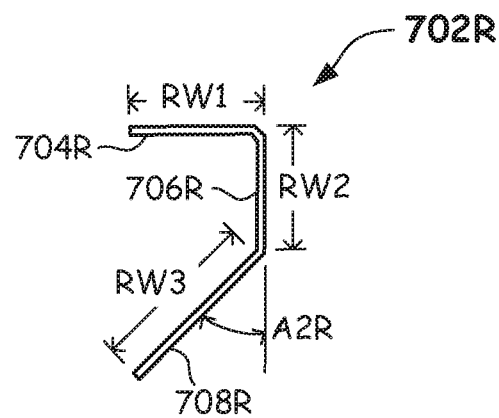

FIGS. 7A-7D illustrate the pair of guide rails 702 according to embodiments. In particular, FIGS. 7A and 7B illustrate a left guide rail 702L, and FIGS. 7C and 7D illustrate a right guide rail 702R. Each of left guide rail 702L and right guide rail 702R may be made from a single piece of stainless steel. Other suitable materials may be used. Each of left guide rail 702L and right guide rail 702R may have a number of fastening/mounting holes 718 (six are shown on each guide rail of which only two are labeled.) At least some fastening/mounting holes 718 may be aligned with corresponding fastening/mounting holes 628 and mounting pins 629 inside interior area 620 of waste chute housing 602. Any suitable fastener or the like may be used to couple left guide rail 702L and right guide rail 702R to interior area 620 of waste chute housing 602. Other embodiments may have other numbers and configurations of fastening/mounting holes 718 (which should closely correspond to and/or be aligned with the numbers and configurations of fastening/mounting holes 628 and mounting pins 629 in waste chute housing 602).

As shown in FIGS. 7A and 7C, left guide rail 702L and right guide rail 702R may be generally symmetrical, but may not be exactly symmetrical in order to conform to the tangential condition of arcuate slot 610. A minimum clearance (which depends on the dimensions of a probe tip) should be maintained as the probe tip transitions from arcuate slot 610 to the pair of guide rails 702. This may provide consistent control of the probe tip as it travels through assembly 300. Left guide rail 702L may include a first section 704L, a second section 706L extending substantially orthogonal from first section 704L, and a third section 708L extending from second section 706L at an angle A2L ranging from, in some embodiments, 40 degrees to 50 degrees. In some embodiments, left guide rail 702L may have a length LL1 ranging from 7.0 cm to 8.2 cm. Length LL1 may depend on the distance between the location of assembly 300 and the location of a probe tip waste bin. In some embodiments, first section 704L may have a width LW1 ranging from 11 mm to 13 mm, second section 706L may have a width LW2 ranging from 9.5 mm to 11.9 mm, and/or third section 708L may have a width LW3 ranging from 13.9 mm to 16.9 mm.

Right guide rail 702R may include a first section 704R, a second section 706R extending substantially orthogonal from first section 704R, and a third section 708R extending from second section 706R at an angle A2R ranging from, in some embodiments, 40 degrees to 50 degrees. In some embodiments, right guide rail 702R may have a length RL1 ranging from 7.0 cm to 8.2 cm. Length RL1 may depend on the distance between the location of assembly 300 and the location of a probe tip waste bin. In some embodiments, first section 704R may have a width RW1 ranging from 11 mm to 13 mm, second section 706R may have a width RW2 ranging from 9.5 mm to 11.9 mm, and/or third section 708R may have a width RW3 ranging from 13.9 mm to 16.9 mm. Other dimensions are possible.

As best shown in FIG. 3B, a gap G1 between first section 704L and first section 704R and a gap G2 between third section 708L and third section 708R after installation of left guide rail 702L and right guide rail 702R in waste chute housing 602 should be sized to allow a bottom section (i.e., below the flange) of a probe tip to hang freely through gaps G1 and G2 while the probe tip is substantially in the upright position as the bottom of the flange of the probe tip engages and slides on first section 704L and first section 704R.

Figure 8A:
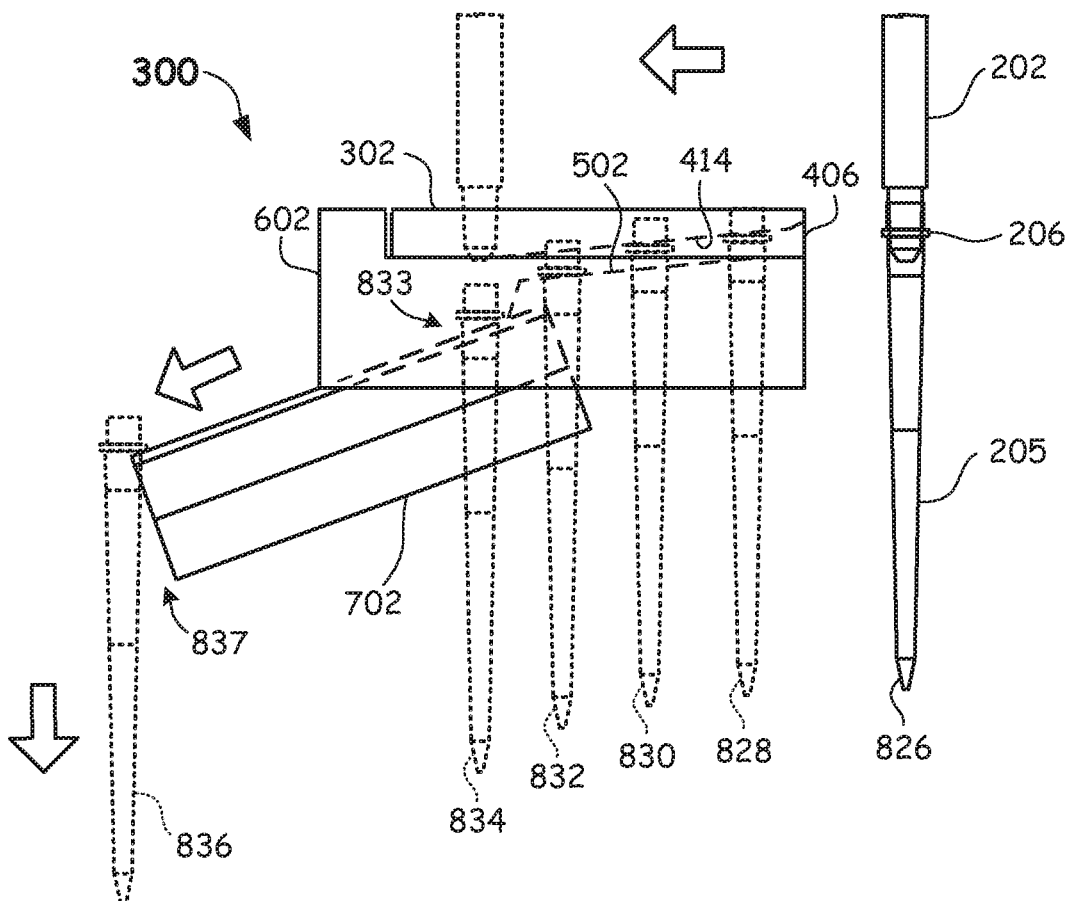
FIGS. 8A, 8B, and 8C illustrate schematic side, top, and enlarged side views of the probe tip eject device and waste chute assembly (with selected internal features shown) of FIGS. 3A and 3B as a probe and probe tip move there through according to embodiments.
Figure 8B:
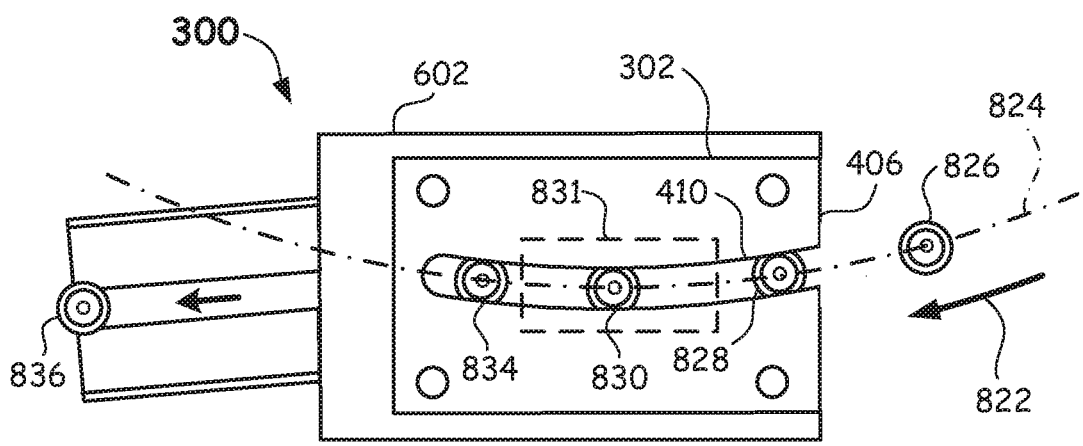
Figure 8C:
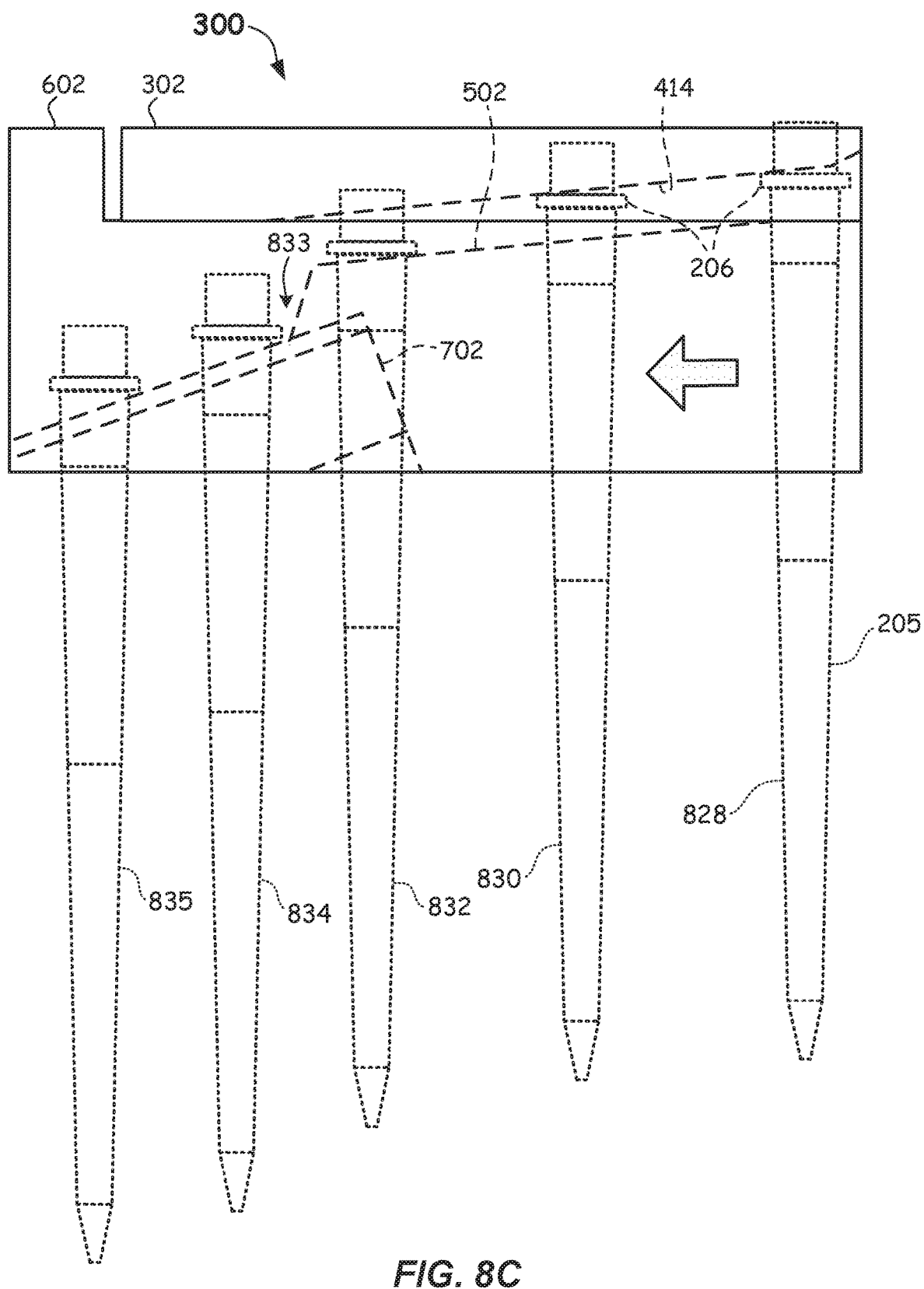

FIGS. 8A-8C illustrate the operation of assembly 300 according to embodiments. Removal of a probe tip from a probe uses the rotational motion 822 of the probe along rotational path 824 as provided by a robot (such as, e.g., robot 104) to drive probe 202 (with press fit probe tip 205 tip) into assembly 300 and, more particularly, into arcuate slot 410 at first side 406 of probe tip eject device 302. Arcuate slot 410 is configured with a radius that conforms to rotational path 824. From a probe tip position 826, probe 202 enters arcuate slot 410 where the top of flange 206 engages ramp 414 of probe tip eject device 302, as shown in probe tip position 828. Note that for clarity, probe 202 is not shown at probe tip positions 828, 830, and 832 in FIG. 8A. As probe 202 continues to rotate along arcuate slot 410, ramp 414, which slopes downward from first side 406, continues to engage the top of flange 206, gradually forcing probe tip 205 to move downward and away from probe 202, thus gradually separating probe tip 205 from bottom portion 203 (see FIG. 2A) of probe 202, as shown in probe tip position 830.

At some point while rotating through a tip eject range 831 (see FIG. 8B), probe tip 205 may separate from probe 202 and drop down through (i.e., the bottom section of the probe tip below flange 206) and onto guide plate 502 (i.e., flange 206 engages guide plate 502), as shown in probe tip position 832. As further shown in FIGS. 8A and 8C, in response to separation of probe tip 205 from probe 202, guide plate 502 may be configured to receive probe tip 205 in a substantially upright position from probe tip eject device 302 (through bottom opening 416 in bottom 405 of probe tip eject device 302; see FIG. 4C). Although separated from probe 202, at least some of bottom portion 203 of probe 202 may still be in loose contact with top portion 204 of probe tip 205, which may thus move probe tip 205 through arcuate slot 510 of guide plate 502 as probe 202 continues to rotate through arcuate slot 410. This may continue until probe tip 205 reaches keyhole 511 (see FIGS. 5A and 5B), whereupon the bottom section of probe tip 205 below flange 206 may drop vertically downward through gaps G1 and G2 and flange 206 may drop onto first section 704L and first section 704R of the pair of guide rails 702 installed in waste chute housing 602 of probe tip waste chute 304, as shown in probe tip position 834. As further shown in FIGS. 8A and 8C, the pair of guide rails 702 may have a first end 833 configured to receive probe tip 205 in a substantially upright position from guide plate 502. Because the pair of guide rails 702 is sloped downward from guide plate 502, probe tip 205 may slide downward via gravity along the pair of guide rails 702 to a second end 837 of the pair of guide rails 702, as shown in probe tip positions 835 (FIG. 8C) and 836. The pair of guide rails 702 may be configured to drop probe tip 205 in the substantially upright position from second end 837 into the center drop of a waste bin (such as, waste bin 114 of FIG. 1) without probe tip 205 contacting and/or splattering any residual bio-liquid onto an internal side wall of the waste bin.

The downward slope angle A1 of ramp 414 and the rotational speed of a probe moving through its rotational path (such as, e.g., rotational path 118 or 824) may dictate the speed at which a probe tip is removed from a probe, which in turn may mitigate the shearing and splashing of residual bio-liquid from a removed probe tip, as described above. In some embodiments, the downward slope angle A1 of ramp 414 may be calculated as follows based on tip removal speed and probe tip rotational speed through the arcuate slot:

$A1 = TAN^{-1}$ (tip removal speed/probe tip rotational speed through the arcuate slot)

In some embodiments, a tip removal speed ranging from 11.0 mm/sec to 13.0 mm/sec and a fixed rotational speed of the probe may yield the best results for mitigating residual bio-liquid shearing and splashing from a tip removal process.

In those embodiments wherein assembly 300 may be located over an incubation ring, such as, e.g., incubation ring 112 of FIG. 1, an incubation ring cover may be in place.

Figure 9:
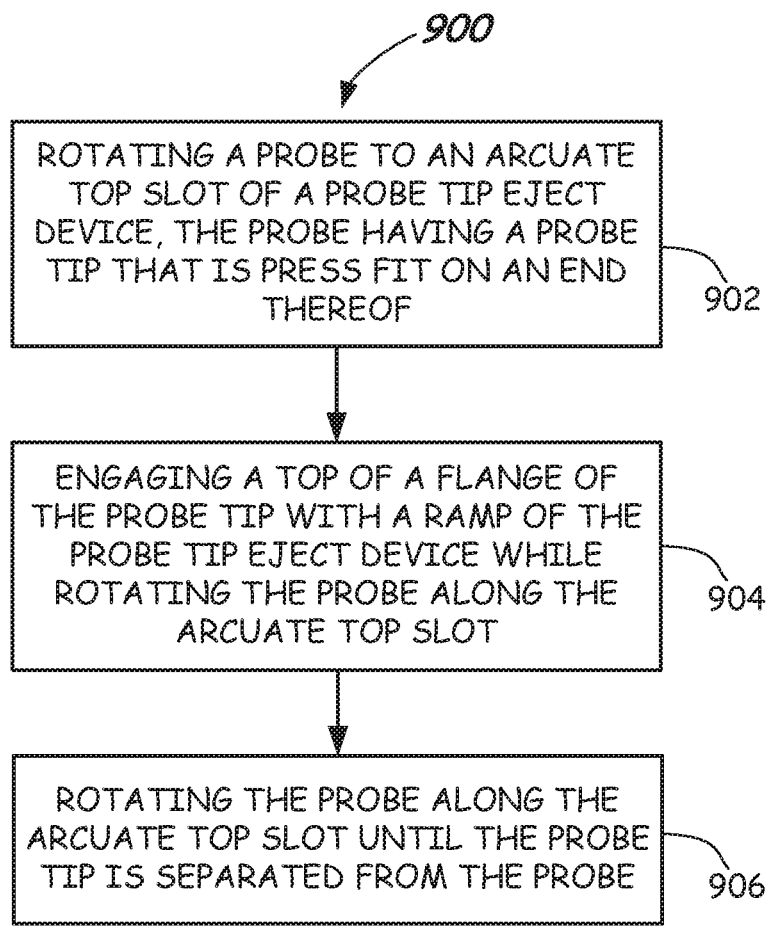
FIG. 9 illustrates a flowchart of a method of removing a probe tip from a probe in an automated diagnostic analysis apparatus according to embodiments.

FIG. 9 illustrates a method 900 of removing a probe tip from a probe in an automated diagnostic analysis apparatus according to one or more embodiments. Method 900 may be performed by one or more controllers, such as, e.g., system controller 102 of FIG. 1. At process block 902, method 900 may include rotating the probe to an arcuate slot of a probe tip eject device, the probe having a probe tip that is press fit on an end thereof. For example, as shown in FIGS. 2B, and 8A-8C, probe 202 having probe tip 205 press fit thereon may be rotated along rotational path 118 or 824 to arcuate slot 410 by robot 104.

At process block 904, method 900 may include engaging a top of a flange of the probe tip with a ramp of the probe tip eject device while rotating the probe along the arcuate slot. For example, as also shown in FIGS. 8A-8C, the top of flange 206 of probe tip 205 may engage ramp 414 of probe tip eject device 302 at probe tip positions 828 and 830 while probe 202 is rotated along arcuate slot 410.

Method 900 may further include, at process block 906, rotating the probe along the arcuate slot until the probe tip is separated from the probe. For example, as shown in FIGS. 8A-8C, probe 202 may be rotated along arcuate slot 410 until probe tip 205 is separated from probe 202 somewhere within tip eject range 831.

Having shown preferred embodiments, those skilled in the art will realize many variations are possible that will still be within the scope of the claimed invention. Therefore, the invention is limited only as indicated by the scope of the claims below.

What is claimed is:

1. A probe tip eject device of an automated diagnostic analysis apparatus, the probe tip eject device comprising:
 a body having a top, a first side, and a second side opposite the first side, the top having an arcuate slot extending there across from the first side toward the second side, the first side having an opening aligned with the arcuate slot, the opening and the arcuate slot each having a width sized to receive a top portion of a probe tip; and
 a ramp disposed within the body that slopes downward from the first side toward the second side, wherein the arcuate slot extends downward through the body and the ramp, the ramp sized to engage a top of a flange of the probe tip, the flange disposed below and extending outward from the top portion of the probe tip.

2. The probe tip eject device of claim 1, wherein the arcuate slot has a center radius ranging from 200 mm to 210 mm.

3. The probe tip eject device of claim 1, wherein the arcuate slot has a width ranging from 6.3 mm to 6.7 mm.

4. The probe tip eject device of claim 1, wherein the ramp slopes downward at an angle ranging from 3 to 8 degrees.

5. The probe tip eject device of claim 1, wherein the ramp slopes downward at an angle equal to:

$TAN^{-1}$ (tip removal speed/rotational speed of the probe tip along the arcuate slot), wherein the tip removal speed ranges from 11.0 mm/sec to 13.0 mm/sec.

6. The probe tip eject device of claim 1, wherein the body further has a bottom opening extending there across from the first side toward the second side, the bottom opening having a width wider than the flange of the probe tip.

7. The probe tip eject device of claim 1, wherein the body is rectangular and has a length measured from the first side to the second side ranging from 8.0 cm to 9.0 cm and has a width ranging from 4.0 cm to 4.5 cm.

8. The probe tip eject device of claim 1, wherein the opening at the first side has a width ranging from 1.1 cm to 1.4 cm.

9. The probe tip eject device of claim 1, wherein the body comprises machined plastic.

10. An automated diagnostic analysis apparatus comprises:
    a probe arm;
    a robot coupled to the probe arm and capable of at least rotating the probe arm horizontally;
    a probe coupled to the probe arm and having a probe tip press fit onto an end of the probe, the probe configured to aspirate and dispense a bio-liquid; and
    a probe tip eject device that includes:
        a body having a top, a first side, and a second side opposite the first side, the top having an arcuate slot extending there across from the first side toward the second side, the first side having an opening aligned with the arcuate slot, the opening and the arcuate slot each having a width sized to receive a top portion of the probe tip, and
        a ramp disposed within the body that slopes downward from the first side toward the second side, wherein the arcuate slot extends downward through the body and the ramp, the ramp sized to engage a top of a flange of the probe tip, the flange disposed below and extending outward from the top portion of the probe tip;
    wherein:
        the robot is configured to rotate the probe to the probe tip eject device and along the arcuate slot from the first side toward the second side, and
        rotation of the probe along the arcuate slot from the first side toward the second side causes the probe tip to separate from the probe.

11. The automated diagnostic analysis apparatus of claim 10, further comprising a probe tip waste chute coupled to the probe tip eject device, wherein the probe tip waste chute comprises:
    a guide plate configured to receive the probe tip in a substantially upright position from the probe tip eject device in response to separation of the probe tip from the probe; and
    a pair of guide rails having a first end configured to receive the probe tip in the substantially upright position from the guide plate, the pair of guide rails sloped downward from the guide plate and configured to drop the probe tip in the substantially upright position from a second end of the pair of guide rails.

12. The automated diagnostic analysis apparatus of claim 11, wherein the guide plate has an arcuate slot extending there across aligned with the arcuate slot of the probe tip eject device.

13. The automated diagnostic analysis apparatus of claim 11, wherein the pair of guide rails are sloped downward at an angle ranging from 15 degrees to 25 degrees.

14. The automated diagnostic analysis apparatus of claim 11, further comprising a waste bin disposed to receive the probe tip in the substantially upright position from the pair of guide rails.

15. A method of removing a probe tip from a probe in an automated diagnostic analysis apparatus, the method comprising:
    rotating the probe to an arcuate slot of a probe tip eject device, the probe having a probe tip that is press fit on an end thereof;
    engaging a top of a flange of the probe tip with a ramp of the probe tip eject device while rotating the probe along the arcuate slot; and
    rotating the probe along the arcuate slot until the probe tip is separated from the probe.

16. The method of claim 15, further comprising providing the probe tip eject device with the ramp, the ramp sloped downward from a first side of the probe tip eject device toward a second side of the probe tip eject device opposite the first side.

17. The method of claim 16, wherein the rotating the probe along the arcuate slot until the probe tip is separated from the probe comprises gradually separating the probe tip downward and away from the probe as the top of the flange engages the ramp while the probe rotates along the arcuate slot.

18. The method of claim 15, further comprising receiving the probe tip in a substantially upright position from the probe tip eject device into a probe tip waste chute having a guide plate configured to receive the probe tip and having a pair of guide rails configured to receive the probe tip in the substantially upright position from the guide plate.

19. The method of claim 15, further comprising receiving the probe tip in a substantially upright position into a waste bin without the probe tip contacting an internal side wall of the waste bin.

20. The method of claim 15, wherein the probe is rotated along the arcuate slot at a fixed rotational speed.

* * * * *